United States Patent
Higashi (10) Patent No.: US 9,277,077 B2
(45) Date of Patent: Mar. 1, 2016

(54) IMAGE FORMING APPARATUS HAVING POWER SAVE FUNCTION, CONTROL METHOD THEREOF, AND STORAGE MEDIUM

(71) Applicant: CANON KABUSHIKI KAISHA, Tokyo (JP)

(72) Inventor: Hidenori Higashi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/467,475

(22) Filed: Aug. 25, 2014

(65) Prior Publication Data

US 2015/0062607 A1 Mar. 5, 2015

(30) Foreign Application Priority Data

Aug. 27, 2013 (JP) ................................. 2013-175573
May 14, 2014 (JP) ................................. 2014-100380

(51) Int. Cl.
*G06K 15/00* (2006.01)
*H04N 1/00* (2006.01)
*G06F 1/32* (2006.01)
*G06F 11/14* (2006.01)

(52) U.S. Cl.
CPC .............. *H04N 1/00891* (2013.01); *G06F 1/32* (2013.01); *G06F 1/3228* (2013.01); *G06F 11/1441* (2013.01); *H04N 1/00339* (2013.01); *H04N 1/00896* (2013.01); *H04N 2201/0094* (2013.01)

(58) Field of Classification Search
CPC ........................... G06F 1/3275; G11C 11/406
USPC ................................................... 358/1.1–3.29
See application file for complete search history.

(56) References Cited

U.S. PATENT DOCUMENTS

| | | | |
|---|---|---|---|
| 2009/0144577 A1* | 6/2009 | Sarker | 713/340 |
| 2010/0082890 A1* | 4/2010 | Heo et al. | 711/103 |
| 2012/0210076 A1 | 8/2012 | Jang et al. | |
| 2014/0006688 A1* | 1/2014 | Yu et al. | 711/103 |
| 2014/0173268 A1* | 6/2014 | Hashimoto | 713/2 |
| 2014/0310445 A1* | 10/2014 | Fitzpatrick et al. | 711/103 |

FOREIGN PATENT DOCUMENTS

| | | |
|---|---|---|
| CN | 102866962 A | 1/2013 |
| JP | 2013-047913 A | 3/2013 |

OTHER PUBLICATIONS

European Search Report issued in European counterpart application No. EP14182211.4, dated Jan. 20, 2015.

* cited by examiner

*Primary Examiner* — Marcellus Augustin
(74) *Attorney, Agent, or Firm* — Rossi, Kimms & McDowell LLP

(57) ABSTRACT

An image forming apparatus, having an SSD as an auxiliary storage device, which is capable of preventing loss of data in the auxiliary storage device caused by lapse of a retention period in a power save state or a power off state. In a case where the auxiliary storage device is determined to be an SSD based on type information that is acquired when the image forming apparatus is activated, a predicted retention period is calculated, and is set in a part of the apparatus that operates in the power save state. The part of the apparatus that operates in the power save state causes the image forming apparatus to transit from the power save state to a normal state based on the set predicted retention period.

11 Claims, 10 Drawing Sheets

| REMAINING LIFE (%) | PREDICTED RETENTION PERIOD (MONTHS) |
|---|---|
| 5 | 3 |
| 10 | 6 |
| 15 | 9 |
| x | y |

| ID | ITEM NAME | CURRENT VALUE | RAW VALUE |
|----|-----------|---------------|-----------|
| 09 | USE TIME | 100 | 894894 |
| C2 | TEMPERATURE | 40 | 80 |
| 0C | NUMBER OF TIMES OF POWER ACTIVATION | 100 | 38 |
| ... | ... | ... | ... |
| EA | MAXIMUM NUMBER OF TIMES OF ERASURE | 100 | 7DF98999F00 |
| EB | AVERAGE NUMBER OF TIMES OF ERASURE | 100 | 598A09A2B00 |

FIG. 6B

| REMAINING LIFE (%) | PREDICTED RETENTION PERIOD (MONTHS) |
|--------------------|--------------------------------------|
| 5 | 3 |
| 10 | 6 |
| 15 | 9 |
| x | y |

IMAGE FORMING APPARATUS HAVING POWER SAVE FUNCTION, CONTROL METHOD THEREOF, AND STORAGE MEDIUM

BACKGROUND OF THE INVENTION

1. Field of the Invention

The present invention relates to an image forming apparatus, a control method thereof, and a storage medium, and more particularly, to an image forming apparatus which includes an SSD as an auxiliary storage device and which is capable of preventing loss of data in the SSD caused by continuance of a power save state or a power off state, a control method thereof, and a storage medium.

2. Description of the Related Art

In recent years, an SSD (Solid State Drive) is more often used as the auxiliary storage device of an image forming apparatus. Compared with a conventional HDD (Hard Disc Drive), the SSD is superior from the standpoint of access time, heat generation, operation sound, impact performance, power consumption, and size.

Generally, an SSD has a plurality of flash memories, installed therein, in which data is saved. With the flash memory, data is saved or erased by electrons being injected into or ejected from a floating gate covered with an insulating material, and at this time, the insulating material has a high voltage applied thereto with the insulating material deteriorated, which causes data to be lost due to self-discharge after a predetermined period of time, that is, after a retention period (a data retention period).

For example, there is a report that, if an SSD used over a period of time specified by JEDEC (Joint Electron Device Engineering Council) is not energized, data in the SSD is unfavorably lost in three months. Also, due to densification of an integrated circuit used in the SSD, data in the SSD is possibly lost due to cutoff of power over a shorter period of time.

With recent power-saving trend, some image forming apparatuses are configured to de-energize the auxiliary storage device at the time of shifting from a normal state to a power save state. In a case where an SSD is used as the auxiliary storage device of such an image forming apparatus, the power save state having continued with the retention period of the SSD elapsed causes the data in the SSD to be lost. Also, when the power of the image forming apparatus is turned off, the auxiliary storage device is not energized, which incurs loss of data if the power off state continues over a long period of time.

Japanese Laid-Open Patent Publication (Kokai) No. 2013-47913 proposes an information processing apparatus that prevents loss of data from a non-volatile storage device by not writing in the non-volatile storage device when the life of the non-volatile storage device is near expiration. However, the proposed technique cannot prevent loss of data due to lapse of the retention period of an SSD.

Also, recent improved multi-functionality of the image forming apparatus allows software operating on the image forming apparatus to become complex with increased scale. Moreover, to use past application development resources, a highly portable application independent of the hardware is, in many cases, operated on a versatile OS installed on the image forming apparatus.

However, it is difficult to prevent loss of data in a non-volatile storage device of an image forming apparatus having a versatile OS, installed therein, on which an application not aware of hardware operates on the versatile OS.

The technique disclosed in Japanese Laid-Open Patent Publication (Kokai) No. 2013-47913 aims to maintain data retention reliability of a non-volatile storage device by suppressing writing in the non-volatile storage device. However, with an image forming apparatus having a versatile OS, installed therein, on which a complex, large-scale application operates, it is difficult to maintain the data retention reliability of the non-volatile storage device (an auxiliary storage device such as an SSD). That is, maintenance of the data retention reliability requires to grasp all the behaviors of the complex, large-scale application, and to perfectly control access from the application to the auxiliary storage device, for example, to eliminate the amount of writing in the auxiliary storage device.

However, with an image forming apparatus having a versatile OS having a complex, large-scale application operating thereon a versatile OS, it is extremely difficult to perfectly control access from the application to an auxiliary storage device, that is, it is difficult to increase the data retention reliability of the auxiliary storage device such as an SSD of such an image forming apparatus.

SUMMARY OF THE INVENTION

The present invention provides an image forming apparatus, including an SSD as an auxiliary storage device, which is capable of preventing loss of data in the SSD caused by lapse of a retention period of the SSD due to continuance of a power save state or a power off state, a control method thereof, and a storage medium.

Also, the present invention provides an image forming apparatus, including an SSD as an auxiliary storage device, which is capable of increasing the data retention reliability of the SSD, a control method thereof, and a storage medium.

According to an aspect of the present invention, there is provided an image forming apparatus configured to be able to transit between a normal state where a normal operation is performed and a power save state where power consumption is reduced than in the normal state, the image forming apparatus comprising: a non-volatile auxiliary storage device; an identification unit configured to acquire type information indicating a type of the auxiliary storage device when the image forming apparatus is activated, and to identify the auxiliary storage device; a setting unit configured to calculate, when the image forming apparatus transits from the normal state to the power save state, a data retention period of the auxiliary storage device identified by the identification unit, and to set the calculated data retention period in a part of the image forming apparatus that operates in the power save state; and a transition unit configured to cause, by the part of the image forming apparatus that operates in the power save state, the image forming apparatus to transit from the power save state to the normal state based on the data retention period set by the setting unit.

According to another aspect of the present invention, there is provided an image forming apparatus having a non-volatile auxiliary storage device, the image forming apparatus comprising: a mounting unit configured to mount or unmount the auxiliary storage device; and an identification unit configured to acquire type information indicating a type of the auxiliary storage device when the image forming apparatus is activated, and to identify the auxiliary storage device, wherein the mounting unit calculates a data retention period of the auxiliary storage device identified by the identification unit, and re-mounts, in a case where the data retention period exceeds a threshold, the auxiliary storage device in a way inhibiting writing.

According to the present invention, with an image forming apparatus including an SSD as an auxiliary storage device, it is possible to prevent loss of data in the auxiliary storage device due to lapse of a retention period in a power save state or a power off state.

Furthermore, according to the present invention, it is possible to increase the data retention reliability of the SSD installed in the image forming apparatus as the auxiliary storage device.

Further features of the present invention will become apparent from the following description of exemplary embodiments (with reference to the attached drawings).

DESCRIPTION OF THE EMBODIMENTS

Embodiments of the present invention will now be described in detail with reference to the appended drawings.

First Embodiment

Figure 1:
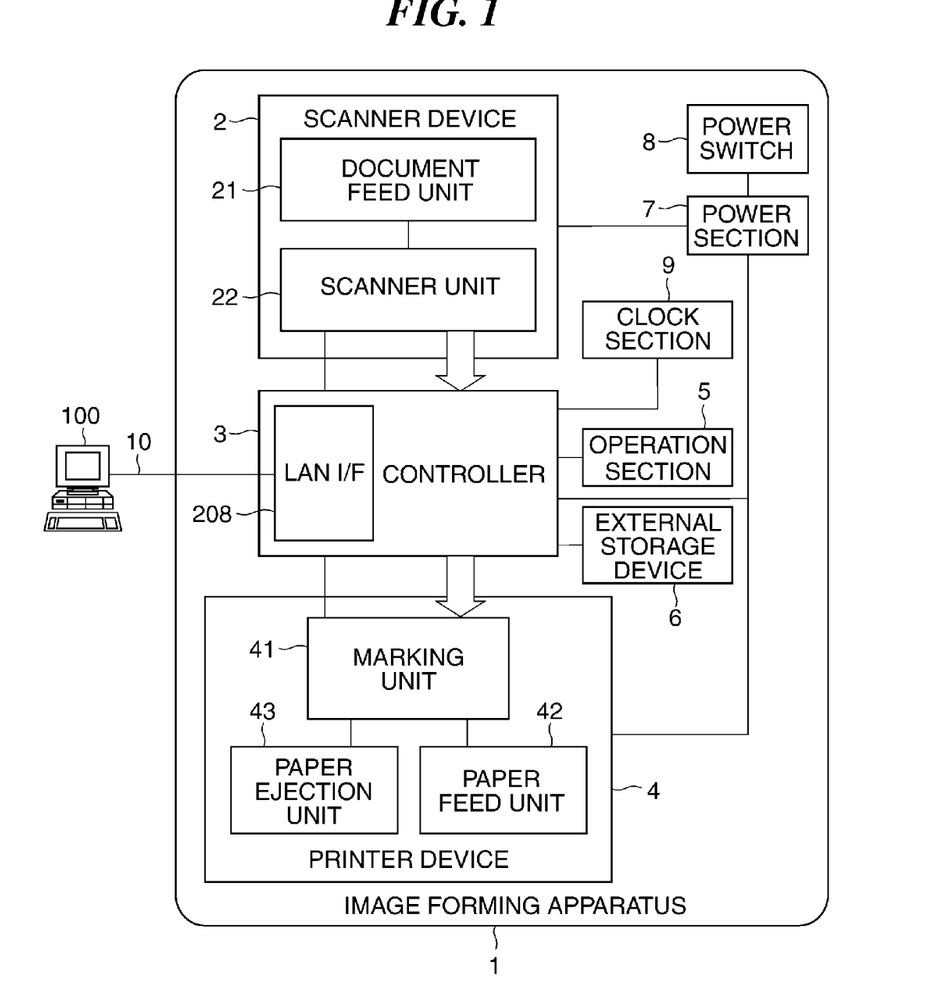
FIG. 1 is a block diagram schematically showing a configuration of an image forming apparatus according to a first embodiment of the present invention.

FIG. 1 is a block diagram schematically showing a configuration of an image forming apparatus according to a first embodiment of the present invention.

In FIG. 1, an image forming apparatus 1 includes a scanner device 2 for reading an image of a document. The scanner device 2 includes a document feed unit 21 for feeding a sheet from a document, and a scanner unit 22 for obtaining a digital image by optically scanning the sheet.

A printer device 4 prints the digital image on a paper medium. The printer device 4 includes a paper feed unit 42 for feeding sheets of paper one by one from a bundle of paper, a marking unit 41 for printing an image on a sheet of paper that is fed, and a paper ejection unit 43 for ejecting a sheet of paper on which an image has been printed.

An operation section 5 includes various keys and buttons (not shown) for operating the image forming apparatus 1, and a display section (not shown) for displaying setting information and job information of the image forming apparatus 1. An external storage device 6 comprises a hard disk drive (HDD) or the like, and stores digital images, control programs and the like, a power section 7 supplies, when a power switch 8 is turned on, power to the scanner device 2, the printer device 4, and a controller 3, and stops the power supply when the power switch 8 is turned off. To a clock section 9 power is supplied by a battery (not shown).

The controller 3 is connected to each section of the apparatus described above, and may execute a job by issuing an instruction to each section of the apparatus. The controller 3 includes a LAN I/F 208 connected to a LAN 10, and is capable of inputting/outputting digital images to/from an external computer 100 over the LAN 10, and of issuing jobs, instructions for appliances, for example.

Figure 2:
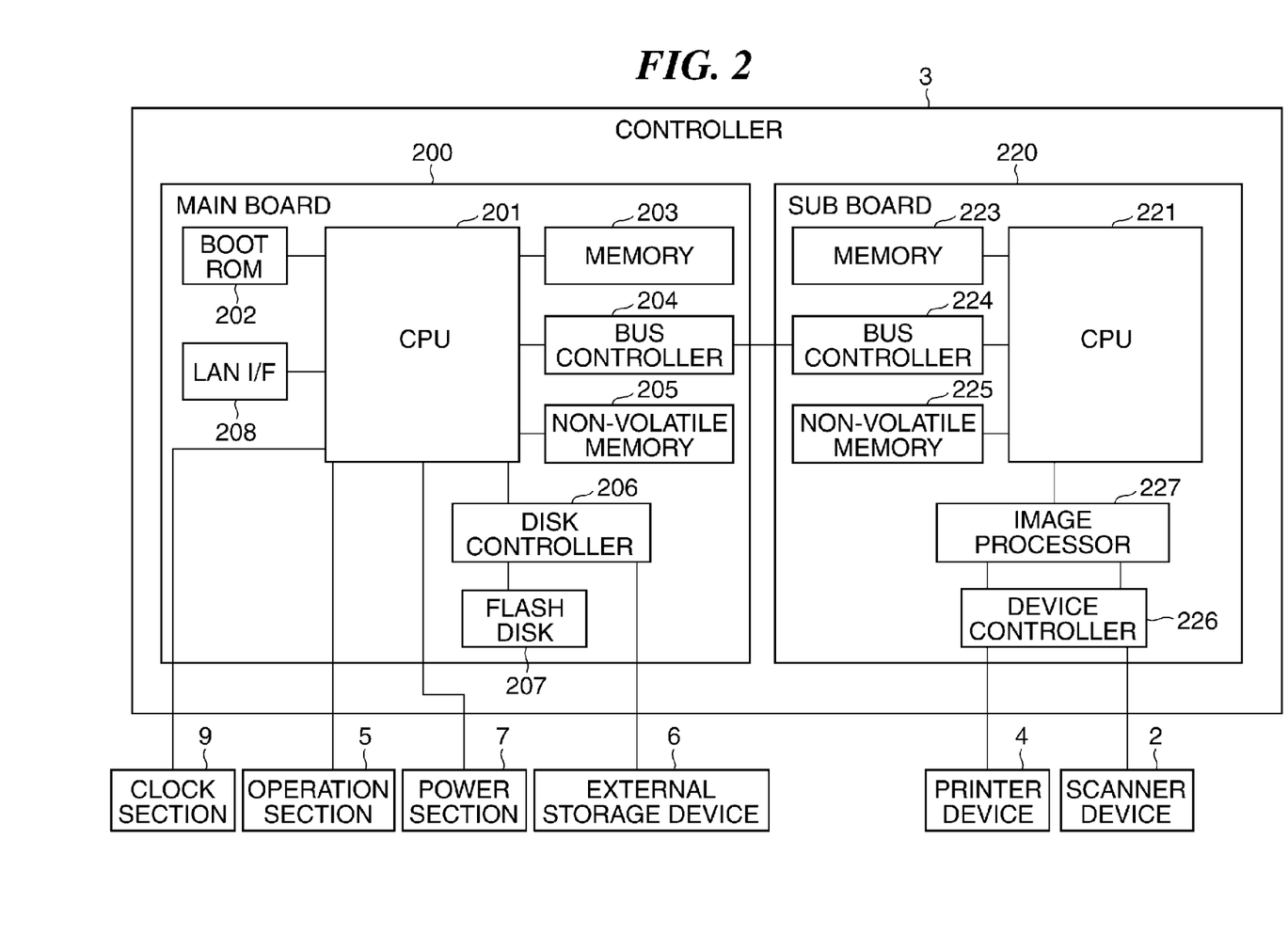
FIG. 2 is a block diagram schematically showing a configuration of a controller of the image forming apparatus.

FIG. 2 is a block diagram schematically showing a configuration of the controller 3 of the image forming apparatus.

The controller 3 comprises a main board 200 and a sub board 220.

The main board 200 is a so-called general-purpose CPU, and is connected to the operation section 5, the external storage device 6, the power section 7, and the clock section 9 over an interface, not shown, and comprises the following devices.

The CPU 201 controls the entire main board. A boot ROM 202 stores a boot program. A memory 203 is used as a work memory of the CPU 201.

A bus controller 204 has a bridge function to an external bus. A non-volatile memory 205 is capable of retaining data even when the power is turned off. A disk controller 206 controls the external storage device 6 and a flash disk 207. The flash disk 207 is a relatively small-capacity auxiliary storage device having a semiconductor memory such as an SSD (Solid State Drive). It should be noted that the auxiliary storage device of the image forming apparatus 1 is not limited to the SSD, and may be an HDD or any other storage device.

The LAN I/F 208 is a network interface used for communication with a device on the network, and is connected to the LAN 10, as described above.

The sub board 220 includes a relatively small general-purpose CPU system and image processing hardware, and is configured from the following devices.

A CPU 221 controls the entire sub board. A memory 223 is used as a work memory of the CPU 221. A bus controller 224 has a bridge function to an external bus. A non-volatile memory 225 is capable of retaining data even when the power is cut off. An image processor 227 implements a digital image process in real time. A device controller 226 is connected to, and controls, the printer device 4 and the scanner device 2.

It should be noted that each of the CPUs 201 and 221 has a chip set, a bus bridge, a clock generator and the like embedded therein or connected thereto, illustration and description thereof, however, are omitted. Also, the configurations of the main board 200 and the sub board 220 are not limited to those shown in the drawings.

Next, a description will be made of an operation of the controller 3 taking a case of reproducing (copying) an image on a paper medium as an example.

When a user issues an instruction regarding image reproduction by the operation section 5, the CPU 201 of the main board 200 transmits an image read command to the scanner device 2 via the CPU 221 of the sub board 220 and the like.

The scanner device 2 transmits digital image data obtained by optically scanning a paper document to the image processor 227 via the device controller 226. The image processor 227 transfers the digital image data transmitted from the scanner device 2 to the memory 223 via the CPU 221, or DMA-transfers the digital image data to the memory 223, and temporarily saves the digital image data in the memory 223.

When all or a predetermined amount of the digital image data has been temporarily stored in the memory 223, the CPU 201 issues an image output instruction to the printer device 4 via the CPU 221 and the like. The CPU 221 notifies the image processor 227 of the storage location of the image data in the memory 223. The image data that is temporarily stored in the memory 223 is transmitted to the printer device 4 via the image processor 227 and the device controller 226 according to a synchronization signal from the printer device 4, and is printed on a paper medium at the printer device 4.

In the case of printing several copies, the CPU 201 may store the image data that is temporarily stored in the memory 223 in the external storage device 6, and may read, when making a second or subsequent copy, the image data from the external storage device 6 and subsequently transmit the data to the printer device 4.

Figure 3:
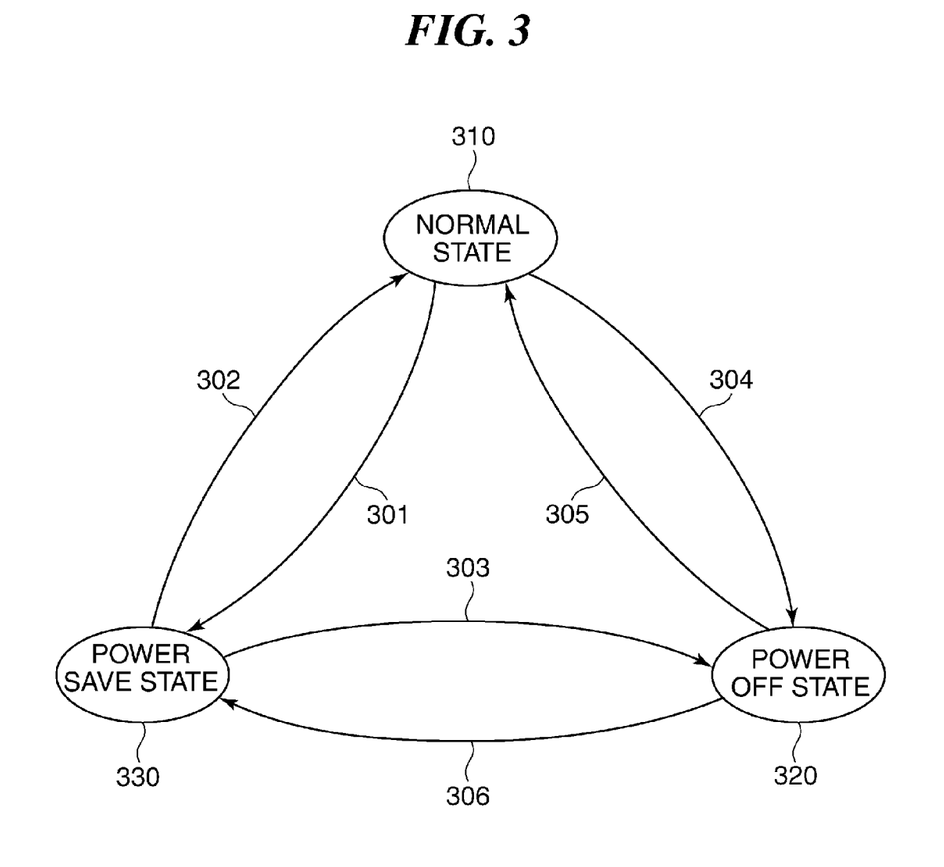
FIG. 3 is a view showing power state transition of the image forming apparatus.

FIG. 3 is a view showing power state transition of the image forming apparatus 1.

When an event for transition to a power save state 330 occurs when the image forming apparatus 1 is in a normal state 310, the image forming apparatus 1 transits from the normal state 310 to the power save state 330, as shown by an arrow 301. The event for transition to the power save state 330 may include an operation for transition to the power save state implemented by a user, a timer interrupt or the like.

When an event for transition to the normal state 310 occurs when the image forming apparatus 1 is in the power save state 330 where power consumption is reduced compared with the normal state 310, the image forming apparatus 1 transits from the power save state 330 to the normal state 310, as shown by an arrow 302. The event for transition to the normal state 310 may include reception of a network packet, a normal state transition operation by a user, a timer interrupt or the like.

When an event for transition to a power off state 320 occurs when the image forming apparatus 1 is in the power save state 330, the image forming apparatus 1 transits from the power save state 330 to the power off state 320, as shown by an arrow 303. The event for transition to the power off state 320 may include a power off operation by a user, power off by remote control, or the like, for example.

When an event for transition to the normal state 310 occurs when the image forming apparatus 1 is in the power off state 320, the image forming apparatus 1 transits from the power off state 320 to the normal state 310, as shown by an arrow 305. The event for transition to the normal state 310 may include a power on operation by a user, a timer interrupt or the like, for example.

When an event for transition to the power save state 330 occurs when the image forming apparatus 1 is in the power off state 320, the image forming apparatus 1 transits from the power off state 320 to the power save state 330, as shown by an arrow 306. The event for transition to the power save state 330 may include a power activation event, for example.

When an event for transition to the power off state 320 occurs when the image forming apparatus 1 is in the normal state 310, the image forming apparatus 1 transits from the normal state 310 to the power off state 320, as shown by an arrow 304. The event for transition to the power off state 320 may include a power off operation by a user, a time interrupt, or the like, for example.

Next, the energization state of each section (each block shown in FIG. 2) of the image forming apparatus 1 when the image forming apparatus 1 is in the normal state 310, the power off state 320, and the power save state 330 will be described.

Figure 4:
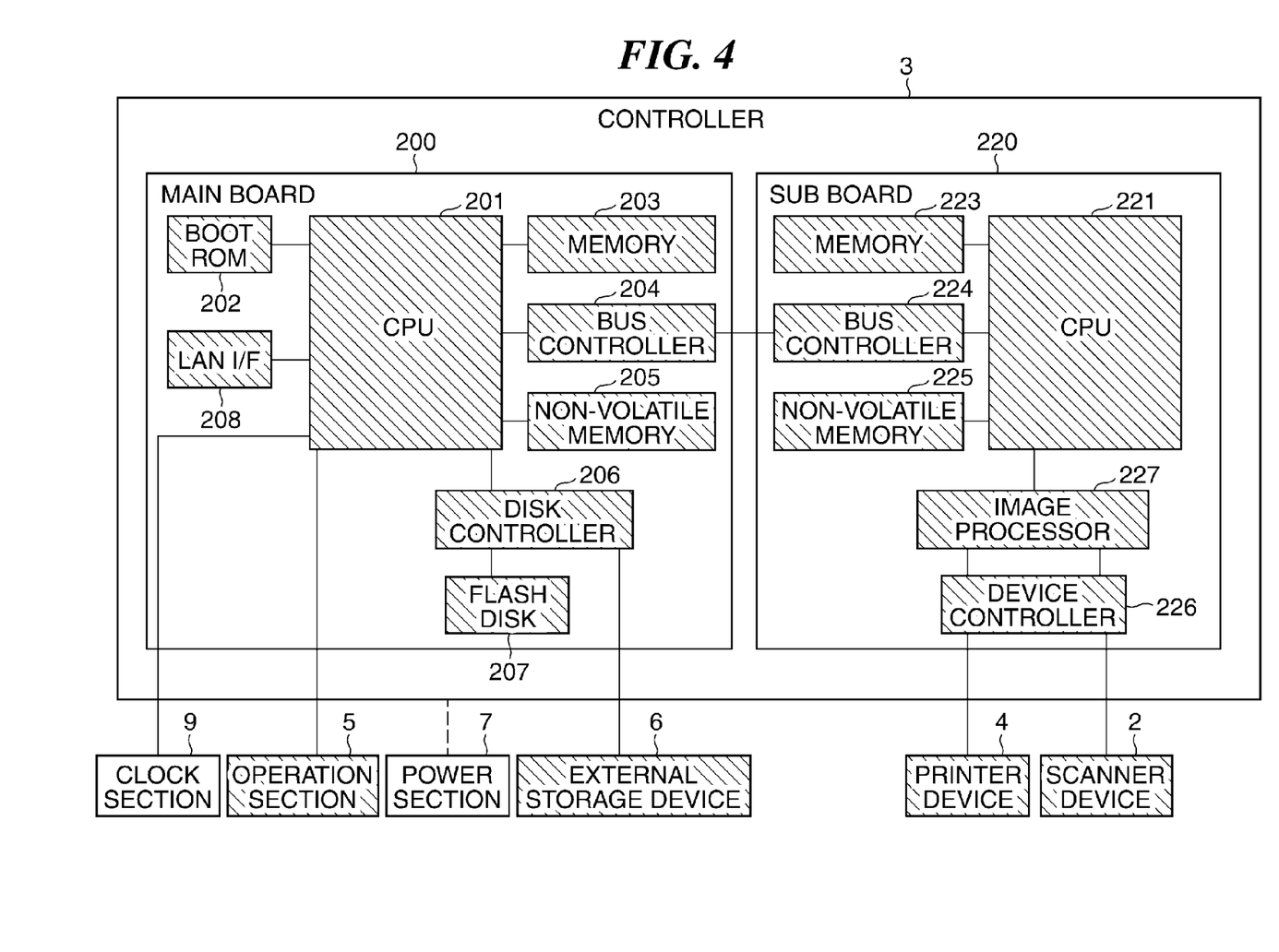
FIG. 4 is a view showing an energization state of each section of the apparatus when the image forming apparatus is in a power off state.
Figure 5:
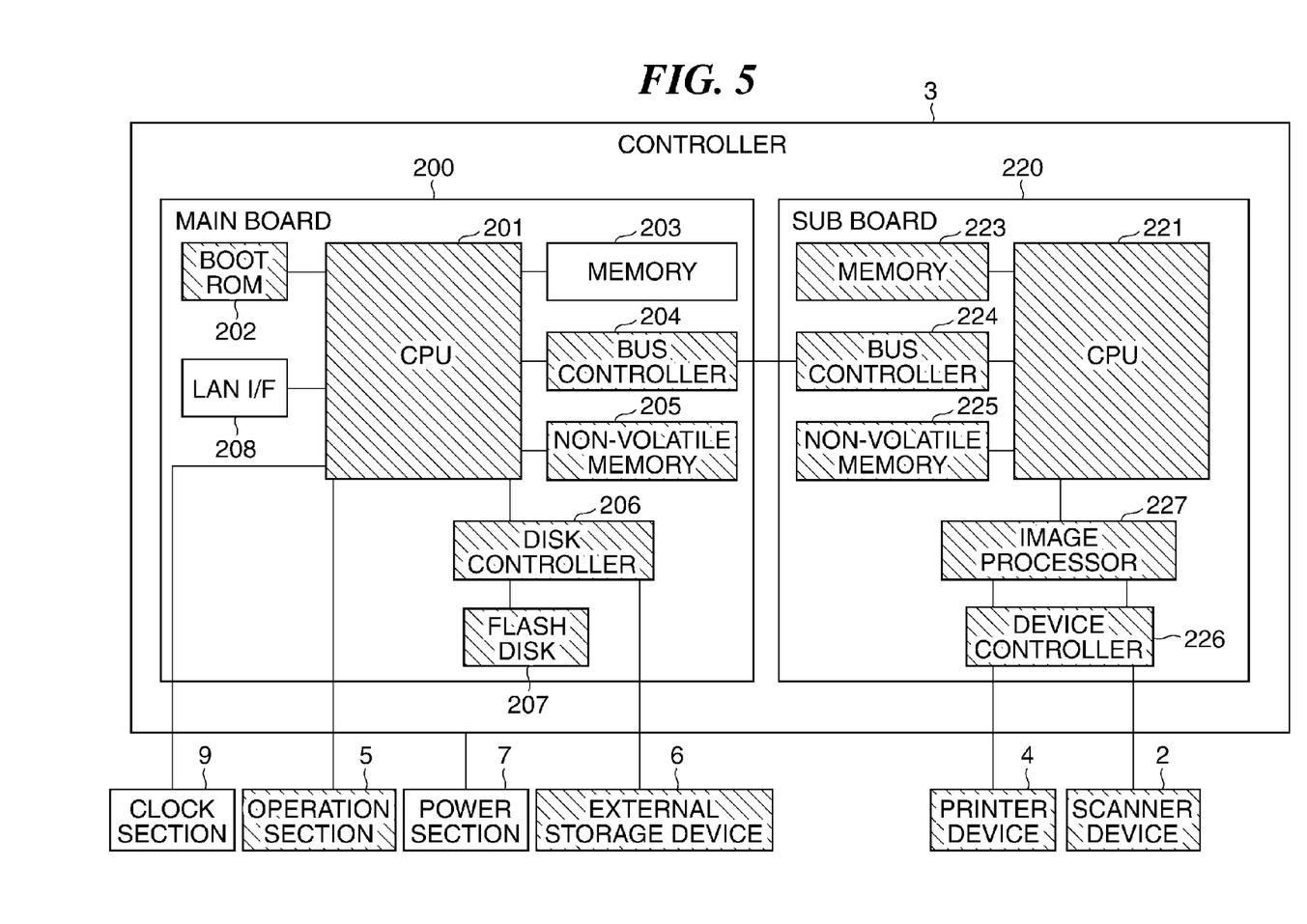
FIG. 5 is a view showing an energization state of each section of the apparatus when the image forming apparatus is in a power save state.

FIG. 4 is a view showing an energization state of each section of the apparatus when the image forming apparatus 1 is in the power off state 320, and FIG. 5 is a view showing an energization state of each section of the apparatus when the image forming apparatus 1 is in the power save state 330.

In the normal state 310, power is supplied to each section (block) of the apparatus, and hence there is no block that is not energized.

As shown in FIG. 4, in the power off state 320, blocks other than the clock section 9, which is supplied with power by a battery (not shown), are hatched in FIG. 4 and are de-energized. Also, as shown by a dotted line, power supply from the power section 7 to the controller 3 is turned off.

As shown in FIG. 5, in the power save state 330, blocks other than the clock section 9, which is supplied with power by a battery, and the memory 203 and the LAN I/F 208, which are supplied with power by the power section 7, are hatched in FIG. 5 and are de-energized. The reason why the memory 203 is energized is to save and retain memory content at the time of transition to the power save state 330, and to allow reference to the memory content at the time of recovery from the power save state 330 to the normal state 310. It should be noted that there may also be a power save state where energization of the LAN I/F 208 is not performed, in addition to the power save state 330 in FIG. 5.

Next, a description will be made of a method of obtaining a predicted value of a retention period (a data retention period) of the SSD according to the first embodiment.

As described above, when saving and erasure of data are repeated by injecting into or ejecting electrons from the floating gate of a flash memory structuring the SSD, the insulating material covering the floating gate is deteriorated. A host controller (for example, the controller 3 of the image forming apparatus 1) may acquire, from the SSD by an ATA command or the like, information indicating the number of times of erasure or the average number of times of erasure of each block in the SSD, and may predict the time when the maximum number of times of erasure or the average number of times of erasure of each block in the SSD reaches a threshold. This enables the retention period of the SSD to be predicted, with possible estimation of the life of the SSD.

Also, with the SSD, SSD parameters may be acquired by execution of a S.M.A.R.T. command.

Figure 6A:
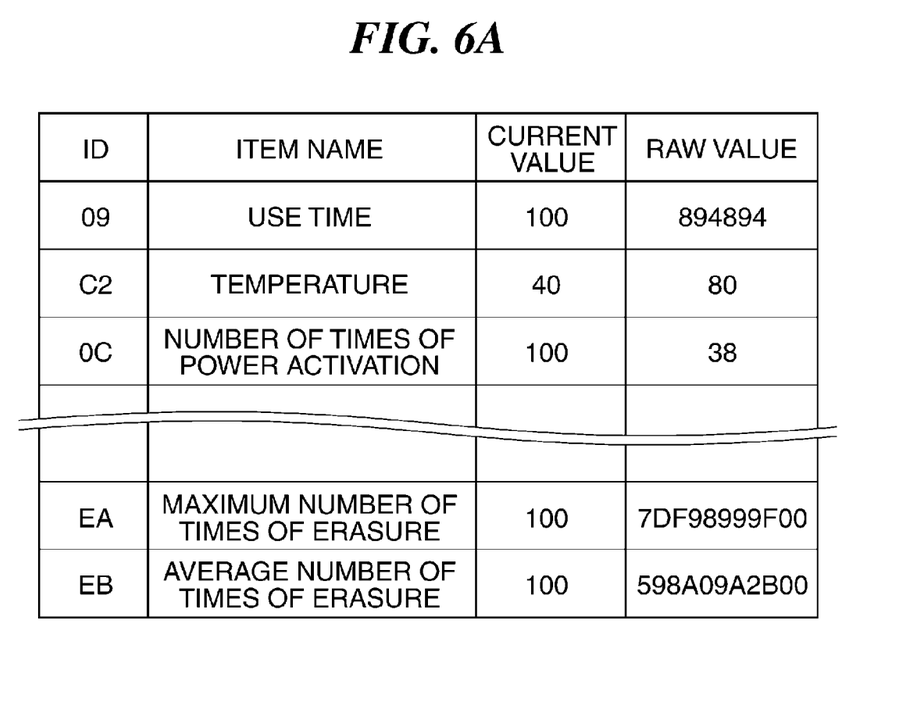
FIG. 6A is a view showing examples of SSD parameters acquired by execution of a S.M.A.R.T. command.
Figure 6B:
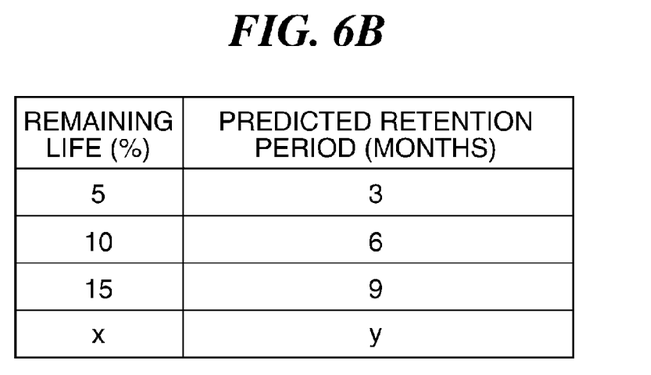
FIG. 6B is a view showing an example of a table showing a predicted retention period according to the remaining life of an SSD.

FIG. 6A is a view showing examples of SSD parameters acquired by execution of a S.M.A.R.T. command, and FIG. 6B is a view showing an example of a table showing a predicted value of the retention period (hereinafter referred to as "the predicted retention period") corresponding to the remaining life of the SSD.

The remaining life (%) of the SSD may be calculated by Equation (1), mentioned below, based on SSD parameters shown in FIG. 6A, such as the use time, the temperature, the number of times of power activation, the maximum number of times of erasure, and the average number of times of erasure. Moreover, the predicted retention period (months) may be calculated by Equation (2), mentioned below, from the remaining life (%). Examples of the calculation results are shown in the table in FIG. 6B.

$$\text{Remaining life} = \{1 - (\text{maximum number of times of erasure} \div \text{number of writable times})\} \times 100 \quad (1)$$

Moreover, the number of writable times is different depending on the type of the SSD, but generally, it is one hundred thousand times for an SLC (Single Level Cell), and ten thousand times for an MLC (Multi Level Cell). It is determined, when determining the number of writable times, whether the type of the SSD is an SLC or an MLC based on the model number or model information of the SSD obtained by executing the S.M.A.R.T. command.

$$\text{Predicted retention period} = 3 + 5 \times \text{remaining life} \qquad (2)$$

It should be noted that parameters other than the parameters in Equation (2) may be used in the calculation of the predicted retention period, but a simple example is shown as Equation (2) to facilitate understanding.

Figure 7:
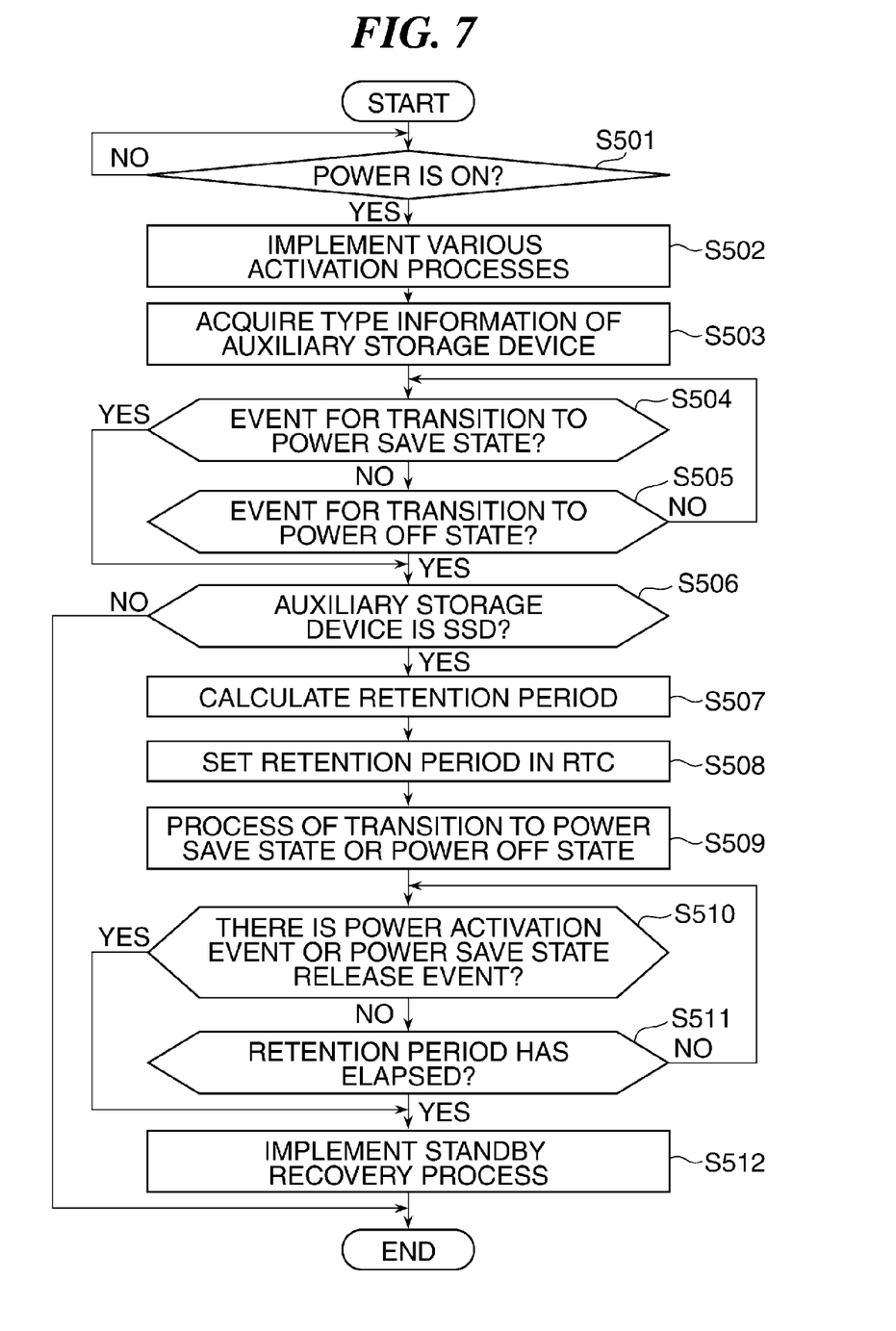
FIG. 7 is a flowchart showing the procedure of a standby recovery process implemented by the image forming apparatus according to the first embodiment.

FIG. 7 is a flowchart showing the procedure of a standby recovery process implemented by the image forming apparatus 1. This process is implemented by the CPU 201 invoking and executing a control program, unless specified otherwise.

The CPU 201 determines whether or not the power of the image forming apparatus 1 is turned on (step S501). When the power of the image forming apparatus 1 is turned on (YES to step S501), various activation processes necessary to use the image forming apparatus 1 are implemented (step S502). After the various activation processes have been completed, the CPU 201 acquires type information indicating the type of the auxiliary storage device (step S503). In the present embodiment, the type information of the flash disk 207 in the controller 3 is acquired, but which is not limited thereto.

Next, the CPU 201 determines whether or not an event for transition to the power save state has occurred (step S504), and determines, if the determination result of the step S504 is negative, whether or not an event for transition to the power off state has occurred (step S505). In a case there has occurred the event for transition to either of the power save state and the power off state, the program proceeds to step S506.

In the step S506, the CPU 201 determines whether or not the auxiliary storage device is an SSD, based on the type information acquired in the step S503. It should be noted that it is possible to identify whether or not a connection destination device is an SSD based on IDENTIFY DEVICE data according to ATA (AT Attachment) standard. Accordingly, in the step S506, it is determined whether or not the auxiliary storage device is an SSD based on the IDENTIFY DEVICE data in the type information acquired in the step S503.

If the auxiliary storage device is not an SSD (NO to the step S506), the program is terminated. On the other hand, when the determination result of the step S506 is affirmative, that is, in a case where it is determined that the auxiliary storage device is an SSD, the CPU 201 calculates the predicted retention period of the SSD by the method described with reference to FIGS. 6A and 6B (step S507).

Next, the CPU 201 sets the predicted retention period calculated in the step S507 in an RTC (Real Time Clock), such as the clock section 9, driven by a battery (step S508), and implements a process of transition to the power save state or the power off state (step S509).

Then, the CPU 201 determines whether or not a power save state release event (a standby recovery event) has occurred after completion of transition to the power save state shown in FIG. 5, or determines whether or not a power activation event has occurred after completion of transition to the power off state shown in FIG. 4 (step S510). In the case where the determination result in step S510 is YES, that is, in the case there is a standby recovery event or a power activation event, the process proceeds to step S512.

On the other hand, in a case where the determination result in the step S510 is negative, that is, in a case where neither the standby recovery event nor the power activation event has occurred, the RTC determines whether or not the predicted retention period (a predicted period) set in the step S508 has elapsed (step S511). In a case where it is determined that the predicted retention period has not elapsed (NO to the step S511), the program returns to step S510. On the other hand, if the predicted retention period has elapsed (YES to the step S511), the program proceeds to step S512.

In the step S512, a standby recovery process is implemented according to a standby recovery instruction from the RTC. In the standby recovery process, the SSD is energized to prevent loss of data retained in the SSD. That is, the SSD is energized before lapse of the retention period of the SSD according to a standby recovery instruction from the RTC which is energized even in the power save state or the power off state, which prevents loss of data in the SSD.

As described above, the predicted retention period of the SSD is calculated, and is set in the RTC which is energized even in the power save state or the power off state. Then, a recovery instruction is issued by the RTC based on the predicted retention period, thereby allowing the SSD to be energized. This enables, with the image forming apparatus including an SSD as the auxiliary storage device, the power save state or the power off state to be continued to prevent loss of data in the SSD without the retention period of the SSD elapsed.

Second Embodiment

An image forming apparatus according to a second embodiment of the present invention is basically the same as that of the first embodiment described above, and hence descriptions of common aspects thereof will be omitted with only the differences described below.

Figure 8:
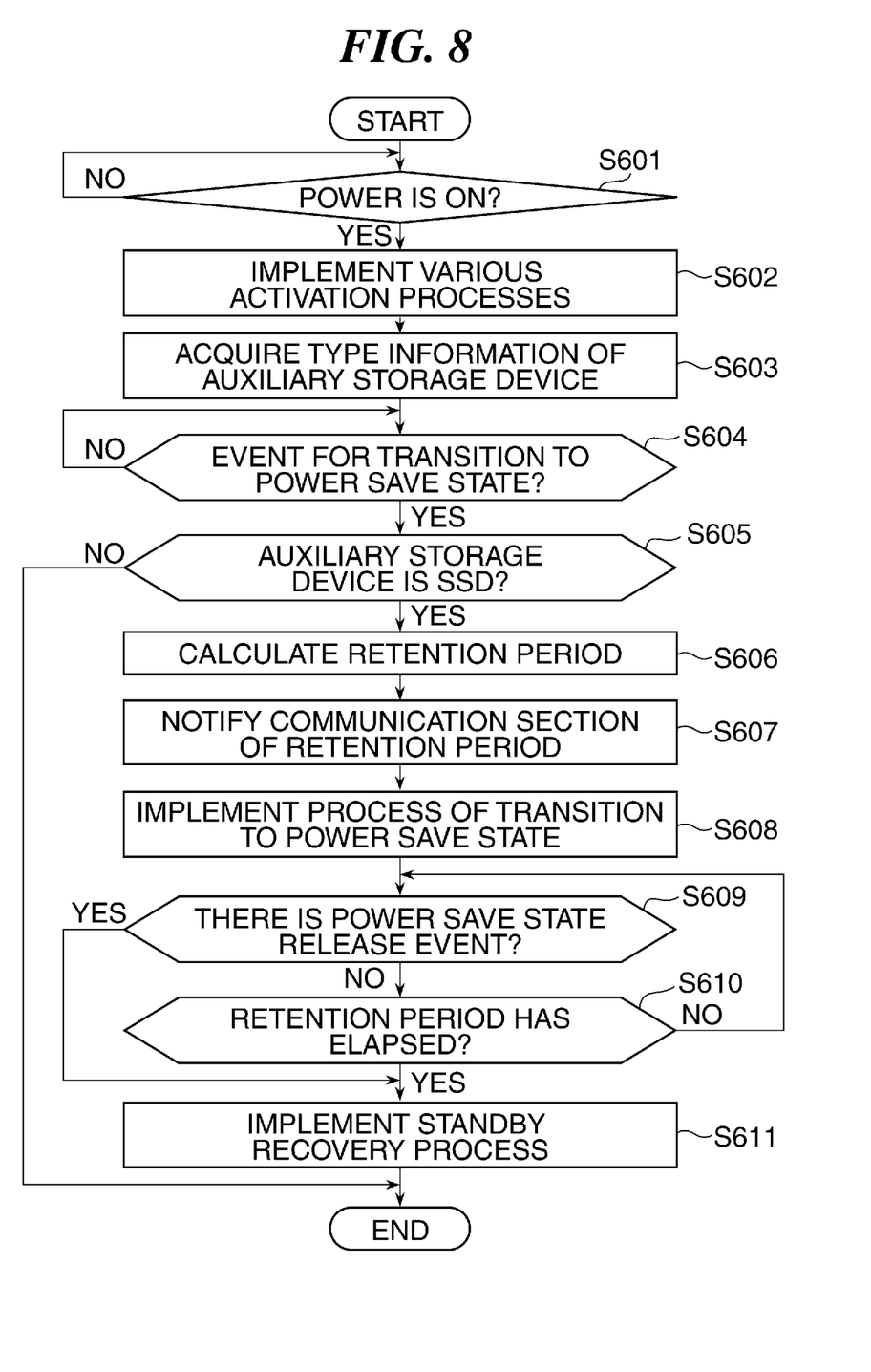
FIG. 8 is a flowchart showing the procedure of a standby recovery process implemented by an image forming apparatus according to a second embodiment of the present invention.

FIG. 8 is a flow chart showing the procedure of a standby recovery process implemented by an image forming apparatus 1 according to a second embodiment of the present invention. This process is implemented by the CPU 201 invoking and executing a control program, unless specified otherwise.

Processes implemented in steps S601 to S604 in FIG. 8 are identical with those in the steps S501 to S504 in FIG. 7. That is, when the power of the image forming apparatus 1 is turned on (YES to step S601), various activation processes are implemented (step S602). After the various activation processes nave been completed, the CPU 201 acquires type information of the auxiliary storage device (step S603), and determines whether or not an event for transition to the power save state has occurred (step S604).

In a case there has occurred an event for transition to the power save state (YES to the step S604), the CPU 201 determines whether or not the auxiliary storage device is an SSD, based on IDENTIFY DEVICE data in the type information acquired in step S603 (step S605). In a case where the determination result in step S605 is negative, the program is terminated. On the other hand, in a case where the determination result in step S605 is affirmative, that is, in a case where the auxiliary storage device is an SSD, the CPU 201 calculates the predicted retention period of the SSD by the method described with reference to FIGS. 6A and 6B (step S606).

Next, the CPU 201 notifies a communication section (for example, the LAN I/F 206), which is supplied with a small amount of power in the power save state, of the predicted retention period calculated in step S606 (step S607), and implements a process of transition to the power save state (step S608).

After completion of transition to the power save state shown in FIG. 5, the communication section determines whether or not a power save state release event (a standby recovery event) has occurred (step S609). In a case there is a power save state release event (YES to the step S609), the communication section transmits a standby recovery instruction, and proceeds to step S611.

On the other hand, in a case there has occurred no standby recovery event (NO to the step S609), the communication section determines whether or not the predicted retention period notified in the step S607 has elapsed (step S610). In a case where the predicted retention period has not elapsed (NO to the step S610), the program returns to step S609. On the other hand, in a case where the predicted retention period has elapsed (YES to the step S610), the communication section transmits a standby recovery instruction, followed by the program proceeding to the step S611.

In the step S611, a standby recovery process is implemented according to the standby recovery instruction from the communication section. In the standby recovery process, the SSD is energized to prevent loss of data retained in the SSD. That is, the SSD is, before the retention period of the SSD elapses, energized according to a standby recovery instruction from the communication section which is energized even in the power save state, thereby preventing loss of data in the SSD.

As described above, the predicted retention period of the SSD is calculated, and is set in the communication section which is energized even in the power save state. Then, a recovery instruction is issued by the communication section based on the predicted retention period, thereby allowing the SSD to be energized. This enables, with the image forming apparatus including an SSD as the auxiliary storage device, the power save state to be continued to prevent loss of data in the SSD without, the retention period of the SSD elapsed.

Third Embodiment

An image forming apparatus according to a third embodiment of the present, invention is basically the same as that of the first embodiment described above, and hence description of common aspects thereof will be omitted with only the differences described below.

Figure 9:
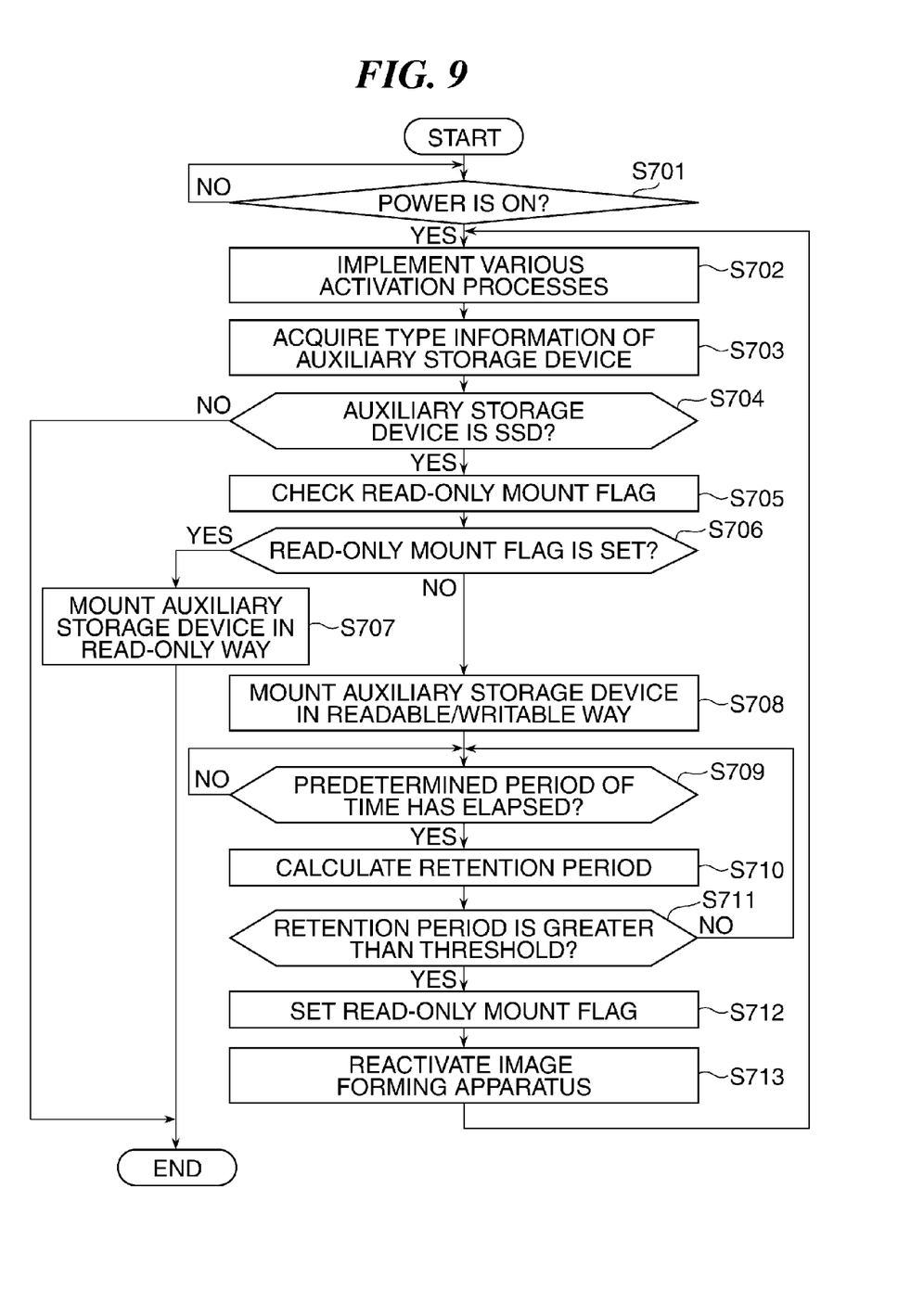
FIG. 9 is a flowchart showing the procedure of a process of mounting an auxiliary storage device implemented by an image forming apparatus according to a third embodiment of the present invention.

FIG. 9 is a flowchart showing the procedure of a process of mounting an auxiliary storage device implemented by an image forming apparatus 1 according to a third embodiment of the present invention. This process is implemented by the CPU 201 invoking and executing a control program, unless specified otherwise.

Processes implemented in steps S701 to S703 in FIG. 9 are identical with those in the steps S501 to S503 in FIG. 7. That is, when the power of the image forming apparatus 1 is turned on (YES to the step S701), various activation processes are implemented (step S702). After the various activation processes have been completed, the CPU 201 acquires type information of the auxiliary storage device (step S703).

Next, the CPU 201 determines whether or not the auxiliary storage device is an SSD, based on IDENTIFY DEVICE data in the type information acquired in step S703 (step S704). In a case where it is determined that, the auxiliary storage device, is not an SSD (NO to the step S704), the program is terminated. On the other hand, in a case where it is determined that the auxiliary storage device is an SSD (YES to the step S704), the CPU 201 checks a read-only mount flag saved in the non-volatile memory 205 (step S705), and determines whether or not the read-only mount flag is set (step S706).

When it is determined that the read-only mount flag is set (YES to the step S706), the CPU 201 unmounts the auxiliary storage device mounted in a readable/writable way, and subsequently mounts the auxiliary storage device in a read-only way (step S707), followed by the program being terminated. On the other hand, in a case where it is determined that, the read-only mount flag is not set (NO to the step S706), the CPU 201 mounts the auxiliary storage device in a readable/writable way (step S708), and determines whether or not a predetermined period of time has elapsed (step S709).

In a case where the predetermined period of time has not elapsed (NO to the step S709), lapse of the predetermined period of time is waited for. On the other hand, if it is determined that the predetermined period of time has elapsed (YES to the step S709), the CPU 201 calculates the predicted retention period of the SSD by the method described with reference to FIGS. 6A and 6B (step S710), and determines whether or not the predicted retention period calculated in the step S710 is greater than a threshold as a reference value of the SSD life set by the designer or the like (step S711).

In a case where the retention period calculated in the step S710 is not greater than the threshold (NO to the step S711), the program returns to the step S709. On the other hand, if the predicted retention period is greater than the threshold (YES to the step S711), the CPU 201 sets, and stores in the non-volatile memory 205, a read-only mount flag for the next activation (step S712), and re-activates the image forming apparatus (step S713), followed by the program returning to the step S702.

According to the third embodiment, the predicted retention period of the SSD is calculated when the auxiliary storage device is identified to be an SSD. Then, in a case where the calculated predicted retention period exceeds the threshold, the SSD is re-mounted in a read-only way so as to inhibit writing (writing access) in the SSD. This increases the data retention reliability of the SSD also in a case where the SSD is installed in the image forming apparatus as the auxiliary storage device.

Also, because the read-only mount flag is set when the calculated predicted retention period exceeds the threshold and the SSD is, after reactivation of the image forming apparatus, mounted again in a read-only way according to the state of the read-only mount flag, it is possible to reliably inhibit writing in the SSD.

Fourth Embodiment

An image forming apparatus according to a fourth embodiment of the present invention is basically the same as that of the first embodiment described above, and hence description of common aspects thereof will be omitted, with only the differences described below.

Figure 10:
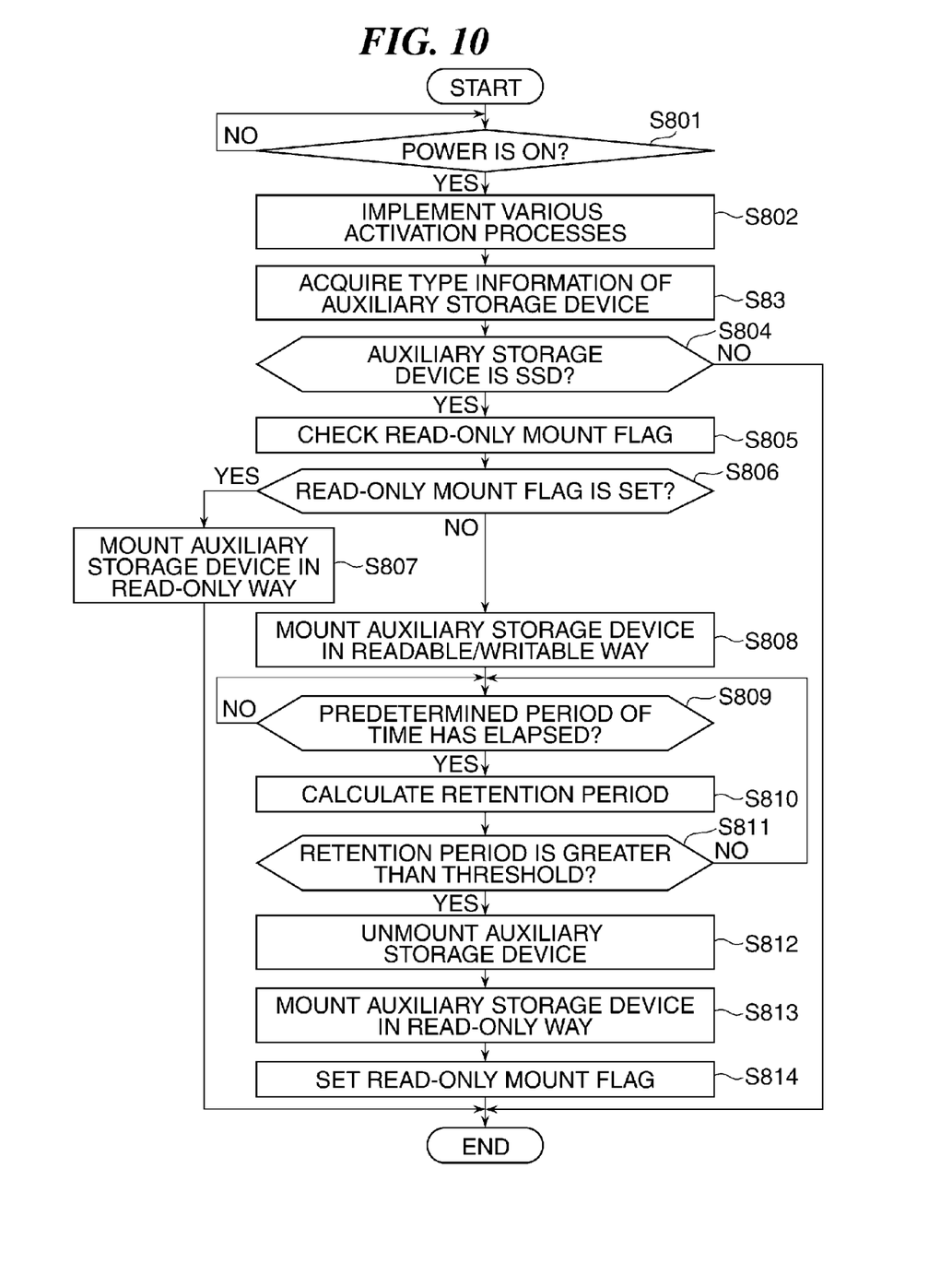
FIG. 10 is a flowchart showing a flow of a process of mounting an auxiliary storage device implemented by an image forming apparatus according to a fourth embodiment of the present invention.

FIG. 10 is a flowchart showing the procedure of a process of mounting an auxiliary storage device implemented by an image forming apparatus 1 according to a fourth embodiment of the present invention. This process is implemented by the CPU 201 invoking and executing a control program, unless specified otherwise.

Processes implemented in steps S801 to S811 in FIG. 10 are identical with those in steps S701 to S711 in FIG. 9. That is, when the power of the image forming apparatus 1 is turned on (YES to step S801), various activation processes are implemented (step S802). After the various activation processes nave been completed, the CPU 201 acquires type information of the auxiliary storage device (step S803).

Next, the CPU 201 determines whether or not the auxiliary storage device is an SSD, based on IDENTIFY DEVICE data in the type information acquired in step S803 (step S804). In a case where it is determined that the auxiliary storage device is not an SSD (NO to the step S804), the program is terminated. On the other hand, in a case where it is determined that the auxiliary storage device is an SSD (YES to the step S804), the CPU 201 checks a read-only mount flag (step S805). If it is determined that the read-only mount flag is set (YES to step S806), the CPU 201 unmounts the auxiliary storage device, and subsequently mounts the auxiliary storage device in a read-only way (step S807), followed by the program being terminated. On the other hand, if it is determined that the read-only mount flag is not set (NO to step S806), the CPU 201 mounts the auxiliary storage device in a readable/writable way (step S808), and determines whether or not a predetermined period of time has elapsed (step S809).

In a case where the predetermined period of time has not elapsed (NO to the step S809), lapse of the predetermined period of time is waited for. On the other hand, in a case where it is determined that the predetermined period of time has elapsed (YES to the step S809), the predicted retention period of the SSD is calculated by the method described with reference to FIGS. 6A and 6B (step S810), and it is determined whether or not the predicted retention period calculated in the step S810 is greater than a threshold (step S811).

In a case where, the retention period is not greater than the threshold (NO to the step S811), the program returns to the step S809. On the other hand, in a case where the predicted retention period is greater than the threshold (YES to the step S811), the CPU 201 unmounts the SSD (step S812), mounts the SSD in a read-only way (step S813), and sets the read-only mount flag for the next activation (step S814), followed by the program being terminated.

According to the fourth embodiment, the predicted retention period of the SSD is calculated when the auxiliary storage device is identified to be an SSD. Then, in a case where the calculated predicted retention period exceeds the threshold, the SSD is re-mounted in a read-only way so as to inhibit writing (writing access) in the SSD. This increases the data retention reliability of the SSD also in the case where the SSD is installed in the image forming apparatus as the auxiliary storage device.

Also, when the calculated predicted retention period exceeds the threshold, the SSD is unmounted and is then mounted again in a read-only way, and thus, even if the data retention period of the SSD exceeds the threshold while the image forming apparatus is being used by the user, it is possible to keep using the image forming apparatus without reactivation. It should be noted that it is possible to notify the user, using an UI, of re-mounting of the SSD in a read-only way when the SSD is unmounted in step S812 in FIG. 10.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2013-175573 filed Aug. 27, 2013 and 2014-100380 filed May 14, 2014, which are hereby incorporated by reference herein in their entirety.

What is claimed is:

1. An image forming apparatus configured to be able to transit between a normal state where a normal operation is performed and a power save state where power consumption is less than in the normal state, the image forming apparatus comprising:
   a non-volatile storage device;
   a setting unit configured to calculate, when the image forming apparatus transits from the normal state to the power save state, a data retention period of said non-volatile storage device, and to set the calculated data retention period in a part of the image forming apparatus that operates in the power save state; and
   a transition unit configured to cause, by the part of the image forming apparatus that operates in the power save state, the image forming apparatus to transit from the power save state to the normal state based on the data retention period set by said setting unit,
   wherein the setting unit and the transition unit are implemented by a processor executing at least one program recorded on a memory device.

2. The image forming apparatus according to claim 1, wherein the part of the image forming apparatus that operates in the power save state includes an RTC (Real Time Clock) that is driven by a battery, and a communication section that is supplied with power in the power save state.

3. The image forming apparatus according to claim 1, wherein said setting unit calculates the data retention period of said non-volatile storage device when the image forming apparatus transmits from the normal state to a power off state, and sets the calculated data retention period in a part of the image forming apparatus that operates in the power off state, and
   wherein the part of the image forming apparatus that operates in the power off state causes the image forming apparatus to transit from the power off state to the normal state based on the data retention period set by said setting unit.

4. The image forming apparatus according to claim 1, wherein said setting unit calculates, in a case where said non-volatile storage device is an SSD (Solid State Drive), the data retention period based on a parameter obtained by execution of a self-monitoring, analysis, and reporting technology (S.M.A.R.T.) command.

5. A control method of an image forming apparatus having a non-volatile storage device, the image forming apparatus configured to be able to transit between a normal state where a normal operation is performed and a power save state where power consumption is less than in the normal state, the control method comprising:
   a setting step of calculating, when the image forming apparatus transits from the normal state to the power save state, a data retention period of said non-volatile storage device, and setting the calculated data retention period in a part of the image forming apparatus that operates in the power save state; and a transition step of causing, by the part of the image forming apparatus that operates in the power save state, the image forming apparatus to transit from the power save state to the normal state based on the data retention period set in said setting step.

6. A non-transitory computer-readable storage medium storing a program configured to cause a computer to implement a control method of an image forming apparatus having a non-volatile storage device, the image forming apparatus configured to be able to transit between a normal state where a normal operation is performed and a power save state where power consumption is less than in said normal state, the control method comprising:

a setting step of calculating, when the image forming apparatus transits from the normal state to the power save state, a data retention period of said non-volatile storage device, and setting the calculated data retention period in a part of the image forming apparatus that operates in the power save state; and a transition step of causing, by the part of the image forming apparatus that operates in said power save state, the image forming apparatus to transit from the power save state to the normal state based on the data retention period set in said setting step.

7. An image forming apparatus comprising:

a non-volatile auxiliary storage device;

a mounting unit configured to mount or unmount the auxiliary storage device; and an identification unit configured to acquire type information indicating a type of the auxiliary storage device when the image forming apparatus is activated, and to identify the auxiliary storage device, wherein said mounting unit calculates a data retention period of the auxiliary storage device identified by said identification unit, and re-mounts, in a case where the data retention period exceeds a threshold, the auxiliary storage device in a way inhibiting writing, wherein the mounting unit and the identification unit are implemented by a processor executing at least one program recorded on a memory device.

8. The image forming apparatus according to claim 7, wherein said mounting unit calculates, in a case where the non-volatile auxiliary storage device is an SSD (Solid State Drive), the data retention period based on a parameter obtained by execution of a self-monitoring, analysis, and reporting technology (S.M.A.R.T.) command.

9. The image forming apparatus according to claim 8, wherein the data retention period is represented by a predicted retention period that is calculated based on a parameter obtained by execution of the S.M.A.R.T. command.

10. A control method of an image forming apparatus having a non-volatile auxiliary storage device, the control method comprising:

a mounting step of mounting or unmounting said auxiliary storage device; and an identification step of acquiring type information indicating a type of the auxiliary storage device when the image forming apparatus is activated, and identifying the auxiliary storage device, wherein said mounting step comprises calculating a data retention period of the auxiliary storage device identified in said identification step, and re-mounting, in a case where the data retention period exceeds a threshold, the auxiliary storage device in a way inhibiting writing.

11. A non-transitory computer-readable storage medium storing a program for causing a computer to implement a control method of an image forming apparatus having a non-volatile auxiliary storage device, the control method comprising:

a mounting step of mounting or unmounting said auxiliary storage device; and an identification step of acquiring type information indicating a type of the auxiliary storage device when the image forming apparatus is activated, and identifying the auxiliary storage device, wherein said mounting step comprises calculating a data retention period of the auxiliary storage device identified in said identification step, and re-mounting, in a case where the data retention period exceeds a threshold, the auxiliary storage device in a way inhibiting writing.

* * * * *